(12) United States Patent
Stewart et al.

(10) Patent No.: US 10,010,808 B2
(45) Date of Patent: Jul. 3, 2018

(54) PROCESS AND APPARATUS FOR RECOVERING AND BLENDING HYDROPROCESSED HYDROCARBONS AND COMPOSITION

(71) Applicant: UOP LLC, Des Plaines, IL (US)

(72) Inventors: Douglas G. Stewart, Wheeling, IL (US); James P. Glavin, Naperville, IL (US); Xin X. Zhu, Long Grove, IL (US)

(73) Assignee: UOP LLC, Des Plaines, IL (US)

( * ) Notice: Subject to any disclaimer, the term of this patent is extended or adjusted under 35 U.S.C. 154(b) by 964 days.

(21) Appl. No.: 13/844,513

(22) Filed: Mar. 15, 2013

(65) Prior Publication Data

US 2014/0271398 A1 Sep. 18, 2014

(51) Int. Cl.
*B01J 8/00* (2006.01)
*C10G 47/00* (2006.01)
*B01D 3/00* (2006.01)
*B01D 3/14* (2006.01)

(52) U.S. Cl.
CPC .............. *B01D 3/009* (2013.01); *B01D 3/14* (2013.01); *B01J 8/00* (2013.01); *C10G 47/00* (2013.01); *C10G 2400/04* (2013.01)

(58) Field of Classification Search
None
See application file for complete search history.

(56) References Cited

U.S. PATENT DOCUMENTS

| | | | |
|---|---|---|---|
| 4,116,816 A | | 9/1978 | Davis et al. |
| 4,539,014 A | * | 9/1985 | Sweeney ................. 44/451 |
| 4,640,764 A | * | 2/1987 | Hamilton, Jr. ........ B01J 29/049 |
| | | | 208/110 |
| 5,350,501 A | * | 9/1994 | Ward ................. C10G 47/16 |
| | | | 208/108 |
| 6,444,116 B1 | | 9/2002 | Galiasso et al. |
| 7,462,276 B2 | * | 12/2008 | Wang et al. ............... 208/109 |
| 2002/0179488 A1 | | 12/2002 | Dancuart |
| 2003/0221990 A1 | * | 12/2003 | Yoon et al. ................. 208/59 |
| 2013/0043161 A1 | | 2/2013 | Hoehn et al. |

FOREIGN PATENT DOCUMENTS

WO 2009005598 A1 1/2009

OTHER PUBLICATIONS

U.S. Appl. No. 13/844,455, filed Mar. 15, 2013.
U.S. Appl. No. 13/844,563, filed Mar. 15, 2013.

* cited by examiner

*Primary Examiner* — Jennifer A Leung

(57) ABSTRACT

A process and apparatus provides for blending a heavy naphtha stream with a diesel stream to increase the yield of diesel. The diesel stream is recovered separately from a kerosene stream to leave the kerosene stream undiminished. The blended diesel provides a valuable composition.

15 Claims, 2 Drawing Sheets

PROCESS AND APPARATUS FOR RECOVERING AND BLENDING HYDROPROCESSED HYDROCARBONS AND COMPOSITION

FIELD OF THE INVENTION

The field of the invention is the recovery of hydroprocessed hydrocarbon streams.

BACKGROUND OF THE INVENTION

Hydroprocessing can include processes which convert hydrocarbons in the presence of hydroprocessing catalyst and hydrogen to more valuable products.

Hydrocracking is a hydroprocessing process in which hydrocarbons crack in the presence of hydrogen and hydrocracking catalyst to lower molecular weight hydrocarbons. Depending on the desired output, a hydrocracking unit may contain one or more beds of the same or different catalyst. Hydrotreating is a hydroprocessing process used to remove heteroatoms such as sulfur and nitrogen from hydrocarbon streams to meet fuel specifications and to saturate olefinic compounds. Slurry hydrocracking is a slurried catalytic process used to crack residue feeds to gas oils and fuels.

Hydroprocessing recovery units typically include a stripper for stripping hydroprocessed effluent with a stripping medium such as steam to remove unwanted hydrogen sulfide. The stripped effluent then is heated in a fired heater to fractionation temperature before entering a product fractionation column to recover products such as naphtha, kerosene and diesel.

Maximizing diesel production is desired in several regions of the world due to its increasing demand as a motor fuel. Hydrocracking units are most effective in producing diesel. The common way to increase diesel production is to add kerosene to diesel but kerosene is the primary component for jet fuel which is a highly profitable fuel. Thus, increasing diesel production in the conventional way is at the expense of reducing jet fuel, so there is little to no monetary advantage for moving the kerosene cut into the diesel cut. Moreover, only so much heavy naphtha can be moved into the kerosene cut without diminishing jet fuel performance.

There is a continuing need, therefore, for improved methods of recovering fuel products from hydroprocessed effluents and for increasing diesel recovery.

BRIEF SUMMARY OF THE INVENTION

Applicants have discovered a blend composition of heavy naphtha and diesel with little or no kerosene that improves the diesel recovery while preserving kerosene for jet fuel. The invention comprises a process and apparatus for making the blend composition.

In a process embodiment, the invention comprises a process for separating hydroprocessed effluent comprising separating a hydroprocessed effluent into a heavy naphtha stream having an initial boiling point temperature between about 250° and about 280° F., a kerosene stream having an initial boiling point temperature between about 280° and about 420° F. and a diesel stream having an initial boiling point temperature between about 380° and about 440° F.; and blending the heavy naphtha stream with the diesel stream to provide a blended diesel stream.

In an additional process embodiment, the invention comprises a process for separating hydroprocessed effluent comprising stripping a hydroprocessed effluent stream; separating a stripped hydroprocessed effluent into a heavy naphtha stream having an initial boiling point temperature between about 250° and about 280° F., a kerosene stream having an initial boiling point temperature between about 280° and about 420° F. and a diesel stream having an initial boiling point temperature above 380° F.; and blending the heavy naphtha stream with the diesel stream to provide a blended diesel stream.

In a further process embodiment, the invention comprises a process for separating hydroprocessed effluent comprising separating a hydroprocessed effluent into a heavy naphtha stream having an initial boiling point temperature between about 250° and about 280° F., a kerosene stream having an initial boiling point temperature between about 280° and about 420° F. and a diesel stream having an initial boiling point temperature above 380° F.; and blending the heavy naphtha stream with the diesel stream to provide a blended diesel stream so that the blended diesel stream comprises 1-7 wt-% heavy naphtha.

In an apparatus embodiment, the invention comprises a hydrocracking recovery apparatus comprising a fractionation column for separating a hydroprocessed stream; an overhead line from an overhead of said fractionation column; a kerosene line from a kerosene outlet in a side of said fractionation column; a diesel line from a diesel outlet in the side of said fractionation column below said kerosene outlet; and said diesel line is in communication with said overhead line.

In an additional apparatus embodiment, the invention comprises a hydrocracking recovery apparatus comprising a hydrocracking reactor; a fractionation column in communication with said hydrocracking reactor for separating a hydroprocessed stream; an overhead line taken from an overhead of said fractionation column; a kerosene line taken from a kerosene outlet in a side of said fractionation column; a diesel line taken from a diesel outlet in the side of said fractionation column below said kerosene outlet; and said diesel line is in communication with said overhead line.

In a further apparatus embodiment, the invention comprises a hydrocracking recovery apparatus comprising a hydrocracking reactor; a stripper column in communication with said hydrocracking reactor; a fractionation column in communication with a bottom line from said stripper column; an overhead line taken from an overhead of said fractionation column; a kerosene line taken from a kerosene outlet in a side of said fractionation column; a diesel line taken from a diesel outlet in the side of said fractionation column below said kerosene outlet; and said diesel line is in communication with said overhead line.

In a composition embodiment, the invention comprises a fuel composition comprising a hydrocarbon material having an initial boiling point temperature in range between about 250° and about 300° F., a T10 temperature range between about 360° and about 450° F. and a T95 temperature range between about 600° and about 700° F.

In an additional composition embodiment, the invention comprises a fuel composition comprising a hydrocarbon material having an initial boiling point temperature range between about 250° and about 300° F., a T10 temperature range between about 380° and about 450° F. and a T95 temperature range between about 600° and about 700° F.

In a further composition embodiment, the invention comprises fuel composition comprising a hydrocarbon material having an initial boiling point temperature range between about 250° and about 300° F., a T10 temperature range between about 400° and about 450° F. and a T95 temperature range between about 600° and about 700° F.

DEFINITIONS

Figure 1:
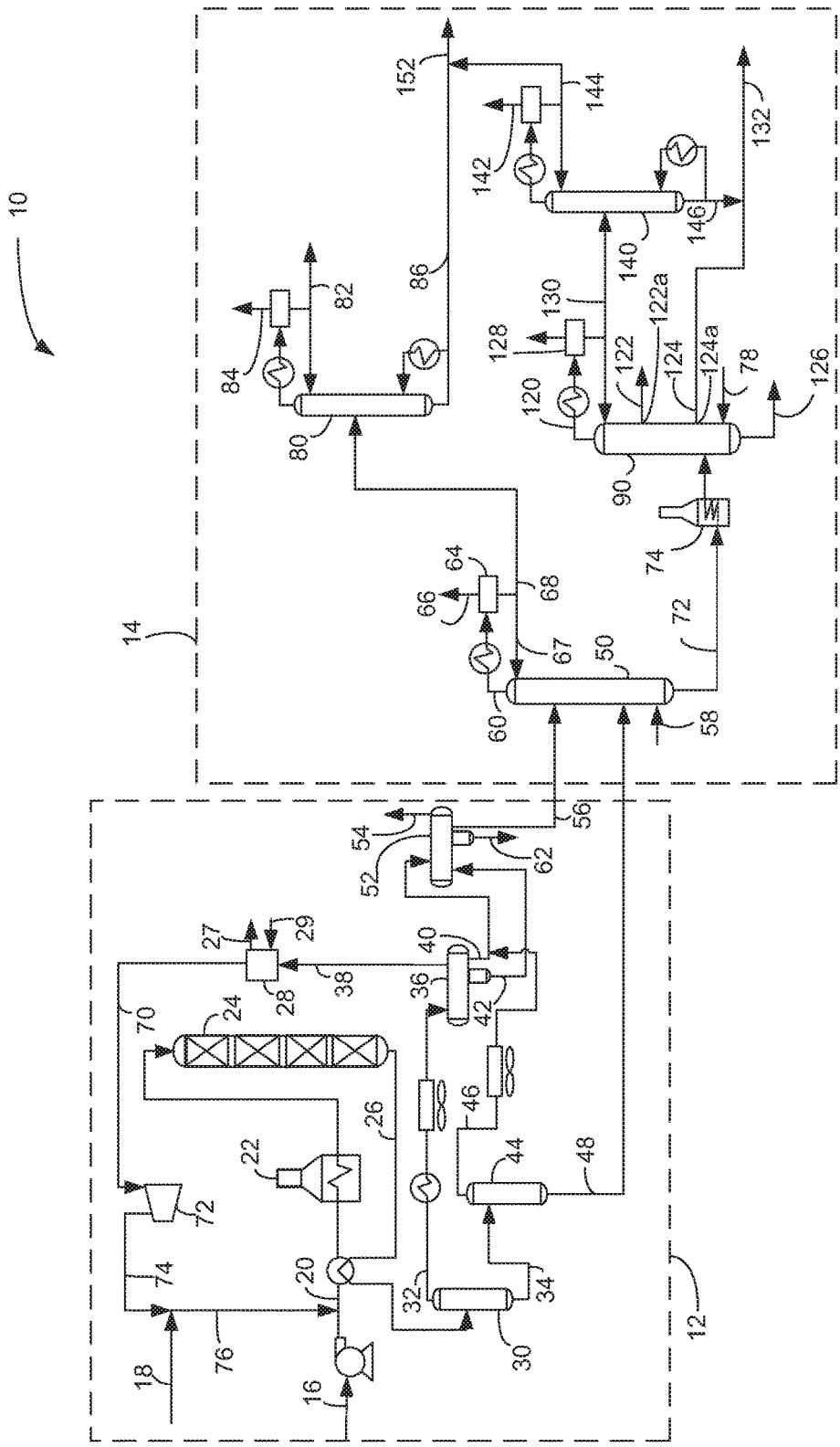
FIG. 1 is a simplified process flow diagram of an embodiment of the present invention.

The term "communication" means that material flow is operatively permitted between enumerated components.

The term "downstream communication" means that at least a portion of material flowing to the subject in downstream communication may operatively flow from the object with which it communicates.

The term "upstream communication" means that at least a portion of the material flowing from the subject in upstream communication may operatively flow to the object with which it communicates.

The term "column" means a distillation column or columns for separating one or more components of different volatilities. Unless otherwise indicated, each column includes a condenser on an overhead of the column to condense and reflux a portion of an overhead stream back to the top of the column and a reboiler at a bottom of the column to vaporize and send a portion of a bottoms stream back to the bottom of the column. Feeds to the columns may be preheated. The top pressure is the pressure of the overhead vapor at the vapor outlet of the column. The bottom temperature is the liquid bottom outlet temperature. Overhead lines and bottoms lines refer to the net lines from the column downstream of any reflux or reboil to the column. Stripper columns omit a reboiler at a bottom of the column and instead provide heating requirements and separation impetus from a fluidized inert media such as steam.

As used herein, the term "True Boiling Point" (TBP) means a test method for determining the boiling point of a material which corresponds to ASTM D2892 for the production of a liquefied gas, distillate fractions, and residuum of standardized quality on which analytical data can be obtained, and the determination of yields of the above fractions by both mass and volume from which a graph of temperature versus mass % distilled is produced using fifteen theoretical plates in a column with a 5:1 reflux ratio.

ASTM D-86 method is used for modeling atmospheric distillation products including naphtha, kerosene diesel and atmospheric gas oil. In the method, a sample stream is heated in a graduated cylinder. As the sample gets hotter, more of the sample flashes off. Each flash temperature corresponding to a boiling percent is recorded. As used herein, the term "initial boiling point" (IBP) is the distillation temperature at which 0.5 wt-% of the material is vaporized. As used herein, the term "T10" is the distillation temperature at which 10 wt-% of the material is vaporized. As used herein, the term "T95" is the distillation temperature at which 95 wt-% of the material is vaporized.

As used herein, the term "diesel boiling range" means hydrocarbons boiling in the range of between about 450° F. (232° C.) and about 750° F. (399° C.) using the TBP distillation method. "Diesel boiling range" may also have an IBP of between about 380° F. (193° C.) and 440° F. (226° C.) using ASTM D-86 method.

As used herein, the term "kerosene boiling range" means hydrocarbons boiling in the range of between about 380° F. (193° C.) and about 450° F. (232° C.) using the TBP distillation method. "Kerosene boiling range" may also have an IBP of between about 280° F. (137° C.) and 420° F. (216° C.) using ASTM D-86 method.

As used herein, the term "naphtha boiling range" means hydrocarbons boiling in the range of between about 70° F. (21° C.) and about 380° F. (193° C.) using the TBP distillation method.

As used herein, the term "heavy naphtha boiling range" means hydrocarbons boiling in the range of between about 200° F. (93° C.) and about 380° F. (193° C.).

As used herein, the term "heavy-heavy naphtha boiling range" means hydrocarbons boiling in the range of between about 300° F. (149° C.) and about 380° F. (193° C.) using the TBP distillation method. "Heavy-heavy naphtha boiling range" may also have an IBP of between about 250° F. (121° C.) and 280° F. (137° C.) using ASTM D-86 method.

As used herein, the term "separator" means a vessel which has an inlet and at least an overhead vapor outlet and a bottoms liquid outlet and may also have an aqueous stream outlet from a boot. A flash drum and a fractionation column are types of separators.

DETAILED DESCRIPTION

In this invention, heavy naphtha is separated from a naphtha stream and is blended with a diesel stream substantially devoid of kerosene, so it is has an elevated flashpoint. According to the invention, jet fuel can be maintained at the desirable level while diesel can be maximized by blending with heavy naphtha. At the same time, flash points of jet fuel and diesel can be maintained at specifications. As the result, this invention could enhance diesel production by 1-7% and thus improve refining economic margin by $40 million per year for a 200,000 barrel-per-day refinery.

The apparatus and process 10 for hydroprocessing and recovering hydrocarbons comprise a hydrocracking unit 12 and a product recovery unit 14. A hydrocarbon stream in hydrocarbon line 16 and a make-up hydrogen stream in hydrogen make-up line 18 are fed to the hydrocracking unit 12. Hydroprocessing effluent is fractionated in the product recovery unit 14.

A hydrogen stream in hydrogen line 76 supplemented by make-up hydrogen from line 18 may join the hydrocarbon feed stream in feed line 16 to provide a hydrocracking feed stream in feed line 20. The hydrocracking feed stream in line 20 may be heated by heat exchange and in a fired heater 22 and fed to the hydrocracking reactor 24.

In one aspect, the process and apparatus described herein are particularly useful for hydrocracking a hydrocarbonaceous feedstock. Illustrative hydrocarbon feedstocks include hydrocarbonaceous streams having components boiling above about 550° F. (288° C.), such as atmospheric gas oils, vacuum gas oil (VGO) boiling between about 600° F. (315° C.) and about 1050° F. (565° C.), deasphalted oil, coker distillates, straight run distillates, pyrolysis-derived oils, high boiling synthetic oils, cycle oils, hydrocracked feeds, catalytic cracker distillates, atmospheric residue boiling at or above about 650° F. (343° C.) and vacuum residue boiling above about 950° F. (510° C.).

Hydroprocessing that occurs in the hydroprocessing unit may be hydrocracking or hydrotreating. Hydrocracking refers to a process in which hydrocarbons crack in the presence of hydrogen to lower molecular weight hydrocarbons. Hydrocracking is the preferred process in the hydroprocessing unit 12. Consequently, the term "hydroprocessing" will include the term "hydrocracking" herein.

Hydrocracking also includes slurry hydrocracking in which resid feed is mixed with catalyst and hydrogen to make a slurry and is cracked to lower boiling products.

The hydrocracking reactor 24 may be a fixed bed reactor that comprises one or more vessels, single or multiple beds of catalyst in each vessel, and various combinations of hydrotreating catalyst and/or hydrocracking catalyst in one or more vessels. It is contemplated that the hydrocracking reactor 24 be operated in a continuous liquid phase in which the volume of the liquid hydrocarbon feed is greater than the volume of the hydrogen gas. The hydrocracking reactor 24 may also be operated in a conventional continuous gas phase, a moving bed or a fluidized bed hydrocracking reactor.

The hydrocracking reactor 24 may provide total conversion of at least about 20 vol-% and typically greater than about 60 vol-% of the hydrocarbon feed to products boiling below the diesel cut point. A hydrocracking reactor may operate at partial conversion of more than about 50 vol-% or full conversion of at least about 90 vol-% of the feed based on total conversion. A hydrocracking reactor may be operated at mild hydrocracking conditions which will provide about 20 to about 60 vol-%, preferably about 20 to about 50 vol-%, total conversion of the hydrocarbon feed to product boiling below the diesel cut point.

The first vessel or bed in the hydrocracking reactor 24 may include hydrotreating catalyst for the purpose of saturating, demetallizing, desulfurizing or denitrogenating the hydrocarbon feed before it is hydrocracked with hydrocracking catalyst in subsequent vessels or beds in the hydrocracking reactor 24. If the hydrocracking reactor is a mild hydrocracking reactor, it may contain several beds of hydrotreating catalyst followed by fewer beds of hydrocracking catalyst.

A hydrocracking catalyst may utilize amorphous silica-alumina bases or low-level zeolite bases combined with one or more Group VIII or Group VIB metal hydrogenating components if mild hydrocracking is desired to produce a balance of middle distillate and gasoline. In another aspect, when middle distillate is significantly preferred in the converted product over gasoline production, partial or full hydrocracking may be performed in the first hydrocracking reactor 24 with a catalyst which comprises, in general, any crystalline zeolite cracking base upon which is deposited a Group VIII metal hydrogenating component. Additional hydrogenating components may be selected from Group VIB for incorporation with the zeolite base.

The zeolite cracking bases are sometimes referred to in the art as molecular sieves and are usually composed of silica, alumina and one or more exchangeable cations such as sodium, magnesium, calcium, rare earth metals, etc. They are further characterized by crystal pores of relatively uniform diameter between about 4 and about 14 Angstroms ($10^{-10}$ meters). It is preferred to employ zeolites having a relatively high silica/alumina mole ratio between about 3 and about 12. Suitable zeolites found in nature include, for example, mordenite, stilbite, heulandite, ferrierite, dachiardite, chabazite, erionite and faujasite. Suitable synthetic zeolites include, for example, the B, X, Y and L crystal types, e.g., synthetic faujasite and mordenite. The preferred zeolites are those having crystal pore diameters between about 8-12 Angstroms ($10^{-10}$ meters), wherein the silica/alumina mole ratio is about 4 to 6. One example of a zeolite falling in the preferred group is synthetic Y molecular sieve.

The natural occurring zeolites are normally found in a sodium form, an alkaline earth metal form, or mixed forms. The synthetic zeolites are nearly always prepared first in the sodium form. In any case, for use as a cracking base it is preferred that most or all of the original zeolitic monovalent metals be ion-exchanged with a polyvalent metal and/or with an ammonium salt followed by heating to decompose the ammonium ions associated with the zeolite, leaving in their place hydrogen ions and/or exchange sites which have actually been decationized by further removal of water. Hydrogen or "decationized" Y zeolites of this nature are more particularly described in U.S. Pat. No. 3,130,006.

Mixed polyvalent metal-hydrogen zeolites may be prepared by ion-exchanging first with an ammonium salt, then partially back exchanging with a polyvalent metal salt and then calcining. In some cases, as in the case of synthetic mordenite, the hydrogen forms can be prepared by direct acid treatment of the alkali metal zeolites. In one aspect, the preferred cracking bases are those which are at least about 10 percent, and preferably at least about 20 percent, metal-cation-deficient, based on the initial ion-exchange capacity. In another aspect, a desirable and stable class of zeolites is one wherein at least about 20 percent of the ion exchange capacity is satisfied by hydrogen ions.

The active metals employed in the preferred hydrocracking catalysts of the present invention as hydrogenation components are those of Group VIII, i.e., iron, cobalt, nickel, ruthenium, rhodium, palladium, osmium, iridium and platinum. In addition to these metals, other promoters may also be employed in conjunction therewith, including the metals of Group VIB, e.g., molybdenum and tungsten. The amount of hydrogenating metal in the catalyst can vary within wide ranges. Broadly speaking, any amount between about 0.05 percent and about 30 percent by weight may be used. In the case of the noble metals, it is normally preferred to use about 0.05 to about 2 wt-%.

The method for incorporating the hydrogenating metal is to contact the base material with an aqueous solution of a suitable compound of the desired metal wherein the metal is present in a cationic form. Following addition of the selected hydrogenating metal or metals, the resulting catalyst powder is then filtered, dried, pelleted with added lubricants, binders or the like if desired, and calcined in air at temperatures of, e.g., about 700° F. (371° C.) to about 1200° F. (648° C.) in order to activate the catalyst and decompose ammonium ions. Alternatively, the base component may first be pelleted, followed by the addition of the hydrogenating component and activation by calcining.

The foregoing catalysts may be employed in undiluted form, or the powdered catalyst may be mixed and copelleted with other relatively less active catalysts, diluents or binders such as alumina, silica gel, silica-alumina cogels, activated clays and the like in proportions ranging between about 5 and about 90 wt-%. These diluents may be employed as such or they may contain a minor proportion of an added hydrogenating metal such as a Group VIB and/or Group VIII metal. Additional metal promoted hydrocracking catalysts may also be utilized in the process of the present invention which comprises, for example, aluminophosphate molecular sieves, crystalline chromosilicates and other crystalline silicates. Crystalline chromosilicates are more fully described in U.S. Pat. No. 4,363,718.

By one approach, the hydrocracking conditions may include a temperature from about 550° F. (290° C.) to about 875° F. (468° C.), preferably 650° F. (343° C.) to about 833° F. (445° C.), a pressure from about 700 psig (4.8 MPa) (gauge) to about 3000 psig (20.7 MPa) (gauge), a liquid hourly space velocity (LHSV) from about 1.0 to less than about 2.5 hr$^{-1}$ and a hydrogen rate of about 2,500 scf/bbl (421 Nm$^3$/m$^3$) to about 15,000 scf/bbl (2,527 Nm$^3$/m$^3$) oil.

If mild hydrocracking is desired, conditions may include a temperature from about 600° F. (315° C.) to about 825° F. (441° C.), a pressure from about 800 psig (5.5 MPa) (gauge) to about 2000 psig (13.8 MPa) (gauge) or more typically about 1000 psig (6.9 MPa) (gauge) to about 1600 psig (11.0 MPa) (gauge), a liquid hourly space velocity (LHSV) from about 0.5 to about 2 hr$^{-1}$ and preferably about 0.7 to about 1.5 hr$^{-1}$ and a hydrogen rate of about 2,500 scf/bbl (421 Nm$^3$/m$^3$) oil to about 10,000 scf/bbl (1,685 Nm$^3$/m$^3$) oil.

A hydrocracking effluent exits the hydrocracking reactor 24 and is transported in hydrocracking effluent line 26. The hydrocracking effluent comprises material that will become a relatively cold hydrocracking effluent stream and a relatively hot hydrocracking effluent stream. The hydrocracking unit may comprise one or more separators for separating the hydrocracking effluent stream into a cold hydrocracking effluent stream and hot hydrocracking effluent stream.

The hydrocracking effluent in hydrocracking effluent line 26 may in an aspect be heat exchanged with the hydrocracking feed stream in line 20 to be cooled before entering a hot separator 30. The hot separator separates the hydrocracking effluent to provide a vaporous hydrocarbonaceous hot separator overhead stream in an overhead line 32 comprising a portion of a cold hydroprocessed effluent stream and a liquid hydrocarbonaceous hot separator bottoms stream in a bottoms line 34 comprising a portion of a cold hydroprocessed effluent stream and still a portion of a hot hydroprocessed effluent stream. The hot separator 30 in the hydrocracking section 12 is in downstream communication with the hydrocracking reactor 24. The hot separator 30 operates at about 350° F. (177° C.) to about 700° F. (371° C.) and preferably operates at about 450° F. (232° C.) to about 600° F. (315° C.). The hot separator 30 may be operated at a slightly lower pressure than the hydrocracking reactor 24 accounting for pressure drop of intervening equipment. The hot separator may be operated at pressures between about 493 psig (3.4 MPa) (gauge) and about 2959 psig (20.4 MPa) (gauge).

The vaporous hydrocarbonaceous hot separator overhead stream in the overhead line 32 may be cooled before entering a cold separator 36. As a consequence of the reactions taking place in the hydrocracking reactor 24 wherein nitrogen, chlorine and sulfur are removed from the feed, ammonia and hydrogen sulfide are formed. At a characteristic temperature, ammonia and hydrogen sulfide will combine to form ammonium bisulfide and ammonia and chlorine will combine to form ammonium chloride. Each compound has a characteristic sublimation temperature that may allow the compound to coat equipment, particularly heat exchange equipment, impairing its performance. To prevent such deposition of ammonium bisulfide or ammonium chloride salts in the line 32 transporting the hot separator overhead stream, a suitable amount of wash water (not shown) may be introduced into line 32 upstream at a point in line 32 where the temperature is above the characteristic sublimation temperature of either compound.

The cold separator 36 serves to separate hydrogen from hydrocarbon in the hydrocracking effluent for recycle to the hydrocracking reactor 24 in the overhead line 38. The vaporous hydrocarbonaceous hot separator overhead stream may be separated in the cold separator 36 to provide a vaporous cold separator overhead stream comprising a hydrogen-rich gas stream in an overhead line 38 and a liquid cold separator bottoms stream in the bottoms line 40 comprising a portion of the cold hydrocracking effluent stream. The cold separator 36, therefore, is in downstream communication with the overhead line 32 of the hot separator 30 and the hydrocracking reactor 24. The cold separator 36 may be operated at about 100° F. (38° C.) to about 150° F. (66° C.), suitably about 115° F. (46° C.) to about 145° F. (63° C.), and just below the pressure of the hydrocracking reactor 24 and the hot separator 30 accounting for pressure drop of intervening equipment to keep hydrogen and light gases in the overhead and normally liquid hydrocarbons in the bottoms. The cold separator may be operated at pressures between about 435 psig (3 MPa) (gauge) and about 2,901 psig (20 MPa) (gauge). The cold separator 36 may also have a boot for collecting an aqueous phase in line 42.

The liquid hydrocarbonaceous stream in the hot separator bottoms line 34 may be fractionated as hot hydrocracking effluent stream in the product recovery unit 14. In an aspect, the liquid hydrocarbonaceous stream in the bottoms line 34 may be let down in pressure and flashed in a hot flash drum 44 to provide a hot flash overhead stream of light ends in an overhead line 46 comprising a portion of the cold hydroprocessed effluent stream and a heavy liquid stream in a bottoms line 48 comprising at least a portion of the hot hydroprocessed effluent stream. The hot flash drum 44 may be any separator that splits the liquid hydrocracking effluent into vapor and liquid fractions. The hot flash drum 44 may be operated at the same temperature as the hot separator 30 but at a lower pressure of between about 300 psig (2.1 MPa) (gauge) and about 1000 psig (6.9 MPa) (gauge), suitably less than about 500 psig (3.4 MPa) (gauge). The heavy liquid stream in bottoms line 48 may be further fractionated in the product recovery unit 14. In an aspect, the heavy liquid stream in bottoms line 48 may be introduced into a stripper column 50 and comprise at least a portion, and suitably all, of a relatively hot hydrocracking effluent stream. The stripper column 50 is in downstream communication with a bottom of the hot flash drum 44 via bottoms line 48.

In an aspect, the liquid hydrocracking effluent stream in the cold separator bottoms line 40 may be fractionated as a cold hydrocracking effluent stream in the product recovery unit 14. In a further aspect, the cold separator liquid bottoms stream may be let down in pressure and flashed in a cold flash drum 52 to separate the cold separator liquid bottoms stream in bottoms line 40. The cold flash drum 52 may be any separator that splits hydrocracking effluent into vapor and liquid fractions. The cold flash drum may be in communication with a bottom of the cold separator 36 via bottoms line 40. The stripper column 50 may be in downstream communication with a bottoms line 56 of the cold flash drum 52.

In a further aspect, the vaporous hot flash overhead stream in overhead line 46 may be fractionated as a cold hydrocracking effluent stream in the product recovery unit 14. In a further aspect, the hot flash overhead stream may be cooled and also separated in the cold flash drum 52. The cold flash drum 52 may separate the cold separator liquid bottoms stream in line 40 and hot flash vaporous overhead stream in overhead line 46 to provide a cold flash overhead stream in overhead line 54 and a cold flash bottoms stream in a bottoms line 56 comprising at least a portion of a cold hydroprocessed effluent stream. The cold flash bottoms stream in bottoms line 56 comprises at least a portion, and suitably all, of the cold hydroprocessed effluent stream. In an aspect, the stripper column 50 is in downstream communication with the cold flash drum 52 via bottoms line 56. The cold flash drum 52 may be in downstream communication with the bottoms line 40 of the cold separator 50, the overhead line 46 of the hot flash drum 44 and the hydrocracking reactor 24. The cold separator bottoms stream in bottoms line 40 and the hot flash overhead stream in overhead line 46 may enter into the cold flash drum 52 either together or separately. In an aspect, the hot flash overhead line 46 joins the cold separator bottoms line 40 and feeds the hot flash overhead stream and the cold separator bottoms stream together to the cold flash drum 52. The cold flash drum 52 may be operated at the same temperature as the cold separator 50 but typically at a lower pressure of between about 300 psig (2.1 MPa) (gauge) and about 1000 psig (7.0 MPa) (gauge) and preferably no higher than 450 psig (3.1 MPa) (gauge). The aqueous stream in line 42 from the boot of the cold separator may also be directed to the cold flash drum 52. A flashed aqueous stream is removed from a boot in the cold flash drum 52 in line 62.

The vaporous cold separator overhead stream comprising hydrogen in the overhead line 38 is rich in hydrogen. The cold separator overhead stream in overhead line 38 may be passed through a trayed or packed scrubbing tower 28 where it is scrubbed by means of a scrubbing liquid such as an aqueous amine solution in line 27 to remove hydrogen sulfide and ammonia. The spent scrubbing liquid in line 29 may be regenerated and recycled back to the scrubbing tower 64. The scrubbed hydrogen-rich stream emerges from the scrubber via line 70 and may be compressed in a recycle compressor 72 to provide a recycle hydrogen stream in line 74 which is a compressed vaporous hydrocracking effluent stream. The recycle compressor 72 may be in downstream communication with the hydrocracking reactor 24. The recycle hydrogen stream in line 74 may be supplemented with make-up stream 18 to provide the hydrogen stream in hydrogen line 76. A portion of the material in line 74 may be routed to the intermediate catalyst bed outlets in the hydrocracking reactor 24 to control the inlet temperature of the subsequent catalyst bed (not shown).

In the embodiment of FIG. 1, the product recovery section 14 may include a stripper column 50, a debutanizer column 80, a product fractionation column 90 and a separator 140. The stripper 50 is in downstream communication with the hydrocracking reactor 24 for stripping the hydrocracking effluent stream which is a portion of the hydrocracking effluent stream in hydrocracking effluent line 26. In FIG. 1, both the cold hydroprocessed effluent stream 56 and the hot hydroprocessed effluent stream 48 are stripped in the stripper column 50. However, more than one stripper column may be used to strip respective hydroprocessed effluent streams.

The cold hydrocracking effluent stream which in an aspect may be in the cold flash bottoms line 56 may be heated and fed to the stripper column 50 near a top of the column. The hot hydrocracking effluent stream which may be in the hot flash bottoms line 48 may be fed to the stripper column 50 at a location below an inlet for the cold hydrocracking effluent stream. The hydrocracking effluent streams may be stripped in the stripper column 50 with a stripping media which is an inert gas such as steam from line 58 to provide an overhead vapor stream of light naphtha, LPG, hydrogen, hydrogen sulfide, stripping media and other gases in an overhead line 60. At least a portion of the hot vapor stream may be condensed and separated in a receiver 64. An overhead line 66 from the receiver 64 carries vaporous off gas for further treating. Unstabilized liquid naphtha from the bottoms of the receiver 64 may be split between a reflux portion in line 67 refluxed to the top of the stripper column 50 and a net overhead stream which may be transported in product line 68 to further fractionation such as in a debutanizer column 80. The stripper column 50 may be operated with a bottoms temperature between about 320° F. (160° C.) and about 680° F. (360° C.) and an overhead pressure of about 73 psig (0.5 MPa) (gauge) to about 292 psig (2.0 MPa) (gauge). The temperature in the overhead receiver 98 ranges from about 100° F. (38° C.) to about 150° F. (66° C.) and the pressure is essentially the same as in the overhead of the stripper column 50.

A stripped hydroprocessed stream is produced in bottoms line 72. At least a portion of the stripped stream in bottoms line 72 may be fed to the product fractionation column 90. Consequently, the product fractionation column 90 is in downstream communication with the bottoms line 72 of the stripper column 50. A fired heater 74 in downstream communication with the bottoms line 72 may heat at least a portion of the stripped hydroprocessed stream before it enters the product fractionation column 90 in line 74.

The product fractionation column 90 may be in downstream communication with the stripper column 50 for separating the stripped hydroprocessed stream into product streams. The product fractionation column 90 may strip the stripped stream in line 72 with stripping media such as steam from line 78 to provide several product streams. The product streams may include an overhead heavy naphtha stream in overhead line 120 from an overhead of the product fractionation column 90, a kerosene stream having an initial boiling point temperature between about 280° F. (137° C.) and about 420° F. (216° C.) in a kerosene line 122 from a kerosene side outlet 122a, a diesel stream having an initial boiling point temperature above 380° F. (193° C.) and no more than 440° F. (226° C.) in a diesel line 124 from a diesel side outlet 124a, which is below the kerosene side cut outlet 122a and an unconverted oil stream boiling above the diesel range in a bottoms line 126 which may be suitable for further processing, such as in an FCC unit or by recycle to the hydrocracking reactor 24. Heat may be removed from the product fractionation column 90 by cooling the kerosene in line 122 and diesel in line 124 and sending a portion of each cooled stream back to the column. The overhead heavy naphtha stream in line 120 may be condensed and separated in a receiver 128 with liquid being refluxed back to the product fractionation column 90. A net heavy naphtha stream boiling between about 200° F. (93° C.) and about 380° F. (193° C.) TBP is recovered in a net overhead line 130.

The product fractionation column 90 may be operated with a bottoms temperature between about 550° F. (288° C.) and about 700° F. (370° C.), preferably about 650° F. (343° C.) and at an overhead pressure between about 4 psig (30 kPa) (gauge) to about 29 psig (200 kPa) (gauge). A portion of the unconverted oil in the bottoms line 126 may be reboiled and returned to the product fractionation column 90 instead of being stripped with inert gas such as steam in line 78.

In an aspect, the diesel line 124 is in communication with net overhead line 130 to afford blending the heavy naphtha stream with the diesel stream to provide a blended diesel stream in line 132. The diesel line 124 may be out of communication with the kerosene line 122. The kerosene stream is separately recovered and may be isolated from the diesel stream. In an aspect, the heavy naphtha stream comprises about 1 to about 7 wt-%, optimally about 2 to about 6 wt-% and preferably about 3 to about 5 wt-% of the blended diesel stream. In the embodiment of FIG. 1, a separator 140, which may be a fractionation column, separates the heavy naphtha stream into a heavy-heavy naphtha stream before it is blended with the diesel stream.

The net heavy naphtha condensed in the net overhead line 130 is fed to the separator 140 which is in downstream communication with the hydrocracking reactor 12, the stripper column 50 and the product fractionation column 90. The separator 140 separates the heavy naphtha stream to provide a net off-gas stream in line 142 and a condensed net medium naphtha stream in line 144 boiling in the range of about 180° F. (82° C.) to about 300° F. (149° C.) TBP. In a bottoms line 146 from the separator 140, a heavy-heavy naphtha stream is produced which is excellent for blending with the diesel stream in line 124. The heavy-heavy naphtha stream may have an initial boiling point temperature between about 250° F. (121° C.) and about 280° F. (137° C.). Accordingly, the diesel line 124 may be in downstream communication with the separator 140 and specifically a bottoms line 146 of the separator. The separator may be operated at a top pressure of about 150 psig (1034 kPa) (gauge) to about 400 psig (2758 kPa) (gauge) and a bottom temperature of about 300° F. (149° C.) to about 650° F. (343° C.).

The resulting diesel blend has an initial boiling point temperature in a range between about 250° F. (121° C.) and about 300° F. (149° C.), typically between 260° F. (126° C.) and 290° F. (143° C.) and preferably between 270° F. (132° C.) and 280° F. (137° C.). The resulting diesel blend also has a T10 temperature in a range between about 360° F. (182° C.) and about 450° F. (232° C.), typically no less than about 380° F. (193° C.) and preferably no less than 400° F. (204° C.). The resulting diesel blend additionally has a T95 temperature in a range between about 600° F. (316° C.) and about 700° F. (371° C.) and preferably between about 625° F. (329° C.) and about 675° F. (357° C.). Lastly, the diesel blend may have a cetane rating between about 40 and about 60. The diesel blend may also have a density between about 51 lb/ft$^3$ (820 kg/m$^3$) and about 54 lb/ft$^3$ (870 kg/m$^3$). It is also contemplated that some of the kerosene stream may be blended into the diesel blend if necessary so as to meet an applicable density specification.

The unstabilized naphtha in the net overhead line 68 from the stripper 50 may be fed to a debutanizer column 80 in downstream communication with the overhead line 68. In the debutanizer column 80, the overhead stream from the stripper column 50 is separated into a net LPG stream in a net overhead line 82 and a light naphtha stream in a bottoms line 86. The debutanizer column 140 is in downstream communication with the hydrocracking reactor 12 and the stripper column 50. The debutanizer column fractionates the unstabilized naphtha to provide a net off-gas stream in line 84 and a net LPG stream comprising predominantly $C_4$- hydrocarbons in line 82 and a light naphtha stream comprising predominantly $C_5$+ hydrocarbons in bottoms line 86 and boiling between about 70° F. (21° C.) and about 210° F. (99° C.) TBP. The debutanizer column may be operated at a top pressure of about 150 psig (1034 kPa) to about 400 psig (2758 kPa) (gauge) and a bottom temperature of about 300° F. (149° C.) to about 650° F. (343° C.). The pressure should be maintained as low as possible to maintain reboiler temperature as low as possible while still allowing complete condensation with typical cooling utilities without the need for refrigeration. In an aspect, a bottoms line 86 from the debutanizer column is in downstream communication with a net overhead line 144 of the separator 140. The medium naphtha stream in the net overhead line 144 from the separator 140 may be blended with the light naphtha stream in bottoms line 86 to provide a blended gasoline stream boiling in the range of about 70° F. (21° C.) to about 300° F. (149° C.) TBP in line 152 that can be recovered.

Figure 2:
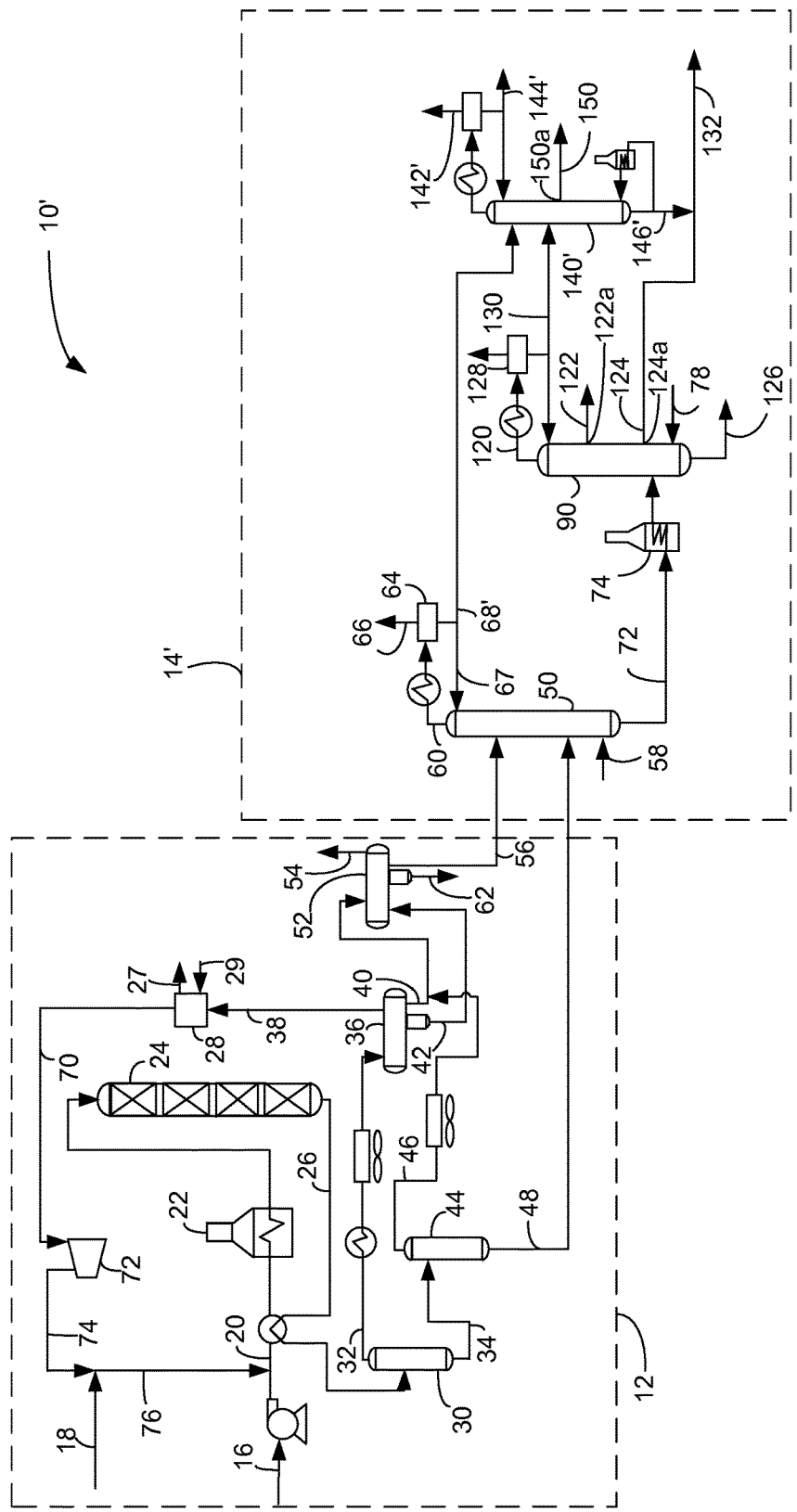
FIG. 2 is a simplified process flow diagram of an alternative embodiment to the embodiment of FIG. 1.

FIG. 2 illustrates an alternate embodiment of FIG. 1 which uses a single separator instead of a separator 140 and a debutanizer column 80 as in FIG. 1. Many of the elements in FIG. 2 have the same configuration as in FIG. 1 and bear the same respective reference number. Elements in FIG. 2 that correspond to elements in FIG. 1 but have a different configuration bear the same reference numeral as in FIG. 1 but are marked with a prime symbol (').

In FIG. 2, the separator 140' is in downstream communication with a net overhead line 68' of the stripper column 50 and the net overhead 130 from the product fractionation column 90. The net overhead stream in line 68' from the stripper column 50 and a net heavy naphtha overhead stream in net overhead line 130 are both separated in the separator 140'. The separator 140' separates a net off-gas stream in line 142' and a condensed net LPG stream in line 144' and a gasoline stream in line 150 boiling in the range of about 70° F. (21° C.) to about 300° F. (149° C.) TBP from a side outlet 150a. In a bottoms line 146' from the separator 140', a heavy-heavy naphtha stream is produced which is excellent for blending with the diesel stream in line 124. The heavy-heavy naphtha stream may have an initial boiling point temperature between about 250° F. (121° C.) and about 280° F. (137° C.). Accordingly, the diesel line 124 is in downstream communication with the separator 140' and specifically a bottoms line 146' of the separator. The separator may be operated at an overhead pressure of about 150 psig (1034 kPa) (gauge) to about 400 psig (2758 kPa) (gauge) and a bottom temperature of about 300° F. (149° C.) to about 650° F. (343° C.).

Preferred embodiments of this invention are described herein, including the best mode known to the inventors for carrying out the invention. It should be understood that the illustrated embodiments are exemplary only, and should not be taken as limiting the scope of the invention.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing, all temperatures are set forth in degrees Celsius and, all parts and percentages are by weight, unless otherwise indicated. Pressures are given at the vessel outlet and particularly at the vapor outlet in vessels with multiple outlets.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A hydrocracking recovery apparatus comprising:
   a hydrocracking reactor for generating a hydroprocessed stream;
   a fractionation column for separating said hydroprocessed stream;
   an overhead line from an overhead of said fractionation column;
   a receiver and a separator in communication with said overhead line;
   a kerosene line from a kerosene outlet in a side of said fractionation column;
   a diesel line from a diesel outlet in the side of said fractionation column below said kerosene outlet; and
   said diesel line is in communication with said overhead line and a bottoms line of said separator.

2. The hydrocracking recovery apparatus of claim 1 further comprising a stripper column and said fractionation column is in communication with a bottom line from said stripper column.

3. The hydrocracking recovery apparatus of claim 2 further said stripper column is in communication with said hydrocracking reactor.

4. The hydrocracking recovery apparatus of claim 3 wherein said separator is in communication with an overhead line of said stripper column.

5. The hydrocracking recovery apparatus of claim 3 further comprising a debutanizer column in communication with an overhead line of said stripper column.

6. The hydrocracking recovery apparatus of claim 4 further comprising a bottoms line from said debutanizer column in communication with an overhead line of said separator.

7. A hydrocracking recovery apparatus comprising:
a hydrocracking reactor;
a fractionation column in communication with said hydrocracking reactor for separating a hydroprocessed stream;
an overhead line taken from an overhead of said fractionation column;
a receiver and a second fractionation column in communication with said overhead line;
a kerosene line taken from a kerosene outlet in a side of said fractionation column;
a diesel line taken from a diesel outlet in the side of said fractionation column below said kerosene outlet; and
said diesel line is in communication with said overhead line and a bottoms line from said second fractionation column.

8. The hydrocracking recovery apparatus of claim 7 further comprising a stripper column in communication with said hydrocracking reactor and said fractionation column is in communication with a bottom line from said stripper column.

9. The hydrocracking recovery apparatus of claim 8 wherein another separator is in communication with an overhead line of said stripper column.

10. The hydrocracking recovery apparatus of claim 8 further comprising a debutanizer column in communication with an overhead of said stripper column.

11. The hydrocracking recovery apparatus of claim 10 further comprising a bottoms line from said debutanizer column in communication with an overhead line of said second fractionation column.

12. A hydrocracking recovery apparatus comprising:
a hydrocracking reactor;
a stripper column in communication with said hydrocracking reactor;
a fractionation column in communication with a bottom line from said stripper column;
an overhead line taken from an overhead of said fractionation column;
a receiver and a separator in communication with said overhead line of said fractionation column;
a kerosene line taken from a kerosene outlet in a side of said fractionation column;
a diesel line taken from a diesel outlet in the side of said fractionation column below said kerosene outlet; and
said diesel line is in communication with said overhead line and a bottoms line from said separator.

13. The hydrocracking recovery apparatus of claim 12 wherein said separator is in communication with an overhead line of said stripper column.

14. The hydrocracking recovery apparatus of claim 12 further comprising a debutanizer column in communication with an overhead of said stripper column.

15. The hydrocracking recovery apparatus of claim 14 further comprising a bottoms line from said debutanizer column in communication with an overhead line of said separator.

* * * * *